(12) United States Patent
Takahashi (10) Patent No.: US 9,501,173 B2
(45) Date of Patent: Nov. 22, 2016

(54) INPUT DEVICE (71) Applicant: ALPS ELECTRIC CO., LTD., Tokyo (JP)

(72) Inventor: Akihiro Takahashi, Miyagi-ken (JP)

(73) Assignee: ALPS ELECTRIC CO., LTD., Tokyo (JP)

(*) Notice: Subject to any disclaimer, the term of this patent is extended or adjusted under 35 U.S.C. 154(b) by 16 days.

(21) Appl. No.: 14/604,110

(22) Filed: Jan. 23, 2015

(65) Prior Publication Data
US 2015/0261381 A1    Sep. 17, 2015

(30) Foreign Application Priority Data

Mar. 17, 2014  (JP) ................... 2014-053535

(51) Int. Cl.
*G06F 3/041* (2006.01)

(52) U.S. Cl.
CPC ... G06F 3/0418 (2013.01); *G06F 2203/04105* (2013.01)

(58) Field of Classification Search
CPC ............... G06F 3/0418; G06F 2203/04105
See application file for complete search history.

(56) References Cited

U.S. PATENT DOCUMENTS

2007/0262968 A1  11/2007  Ohshita et al.
2016/0034089 A1*  2/2016  Kano ............... G06F 3/044
                                                     345/173

FOREIGN PATENT DOCUMENTS

JP       2007-304757       11/2007
WO    WO 2014192710 A1 *  12/2014  ............. G06F 3/044

* cited by examiner

*Primary Examiner* — Michael Pervan
(74) *Attorney, Agent, or Firm* — Beyer Law Group LLP (57) ABSTRACT

An input device includes a coordinate input unit including an operation surface on which a pressing operation can be performed and detecting contact of an operation body with the operation surface, a pressing detection unit that detects that the operation surface is pressed, and a control unit that processes detection results of the coordinate input unit and the pressing detection unit, in which the control unit obtains the center coordinate of a contact position from the detection result of the coordinate input unit, and compares the center coordinate before the pressing operation with the center coordinate after the pressing operation when there is a pressing operation with respect to the operation surface, and when a difference between the center coordinates is smaller than a threshold value, the center coordinate before the pressing operation is used as a center coordinate at the time of the pressing operation.

4 Claims, 10 Drawing Sheets

INPUT DEVICE

CLAIM OF PRIORITY

This application claims benefit of Japanese Patent Application No. 2014-053535 filed on Mar. 17, 2014, which is hereby incorporated by reference.

BACKGROUND OF THE INVENTION

1. Field of the Invention

The present invention relates to an input device, and more particularly, to an input device on which a coordinate input operation and a pressing operation can be performed.

2. Description of the Related Art

An input device that detects a contact operation position in various manners, such as a pressure-sensitive type of sensing contact pressure and reacting or a capacitive type of reacting to a change in capacitance between a finger and a conductive film has been conventionally known.

Since an operator can perform an intuitive input operation, such an input device is widely used for a portable device such as a laptop personal computer, a portable phone, or a tablet terminal or an in-vehicle device such as a navigation device.

Further, an input device on which a pressing operation can be performed together with a contact operation so as to realize a variety of input operations with high performance or the like of the above-described device has been proposed.

Figure 9:
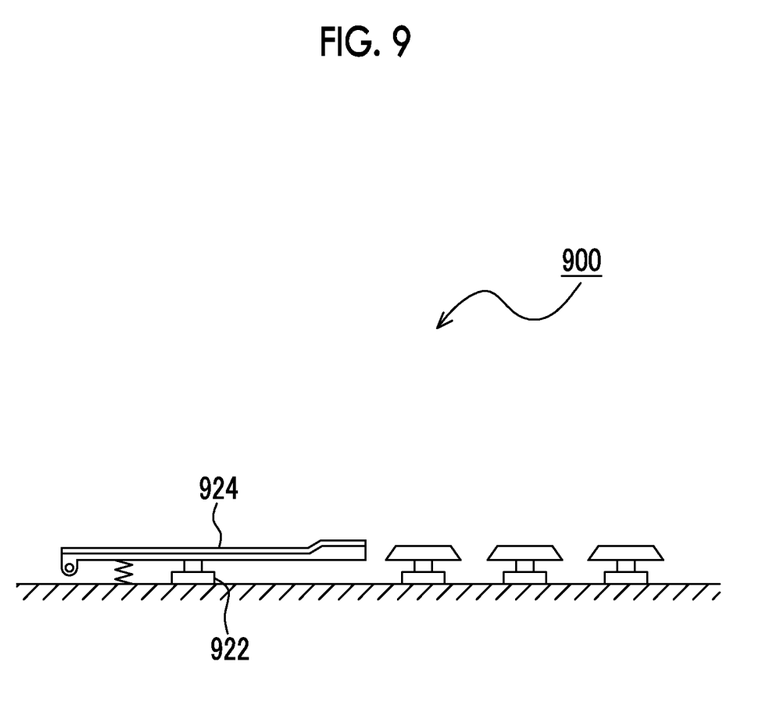
FIG. 9 is a view illustrating an input device in the related art.

An input device 900 described in Japanese Unexamined Patent Application Publication No. 2007-304757 (related art) includes an input pad 924 that can detect a contact position of an operation body, and a data processing unit that analyzes the contact position of the operation body in the input pad 924, is provided in which a switch 922 of which the output is switched when the input pad 924 is pressed, as illustrated in FIG. 9.

In the data processing unit, when the input pad 924 detects the contact of the operation body without the output of the switch 922 being switched, a range including a plurality of areas is a coordinate input portion, and coordinate data corresponding to a position with which the operation body comes in contact in the coordinate input portion is generated as a pad input signal. Further, when the output of the switch 922 is switched, the data processing unit detects which of a plurality of areas divided on the input pad 924 corresponds to the contact position of the operation body, and generates a different input signal for each area with which the operation body comes in contact.

As described above, the input device on which a variety of operation inputs can be performed using the input pad through a combination of the input pad and the switch has been disclosed.

Figure 10A:
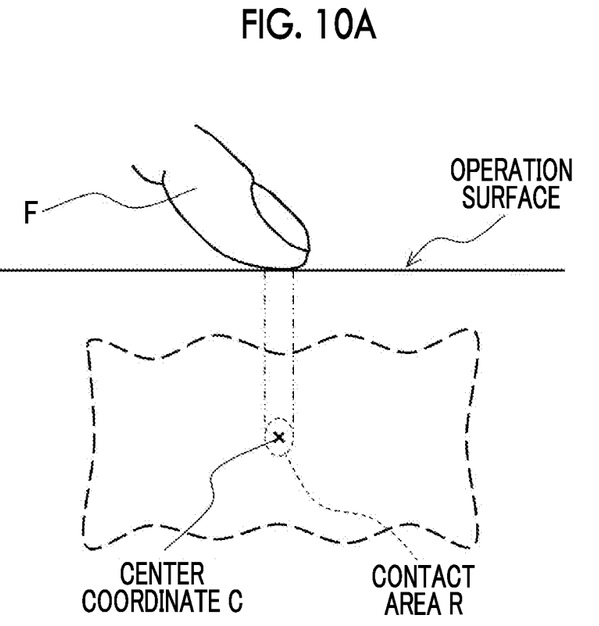
FIGS. 10A and 10B are schematic views illustrating a contact area of a finger as an operation body and a center coordinate.
Figure 10B:
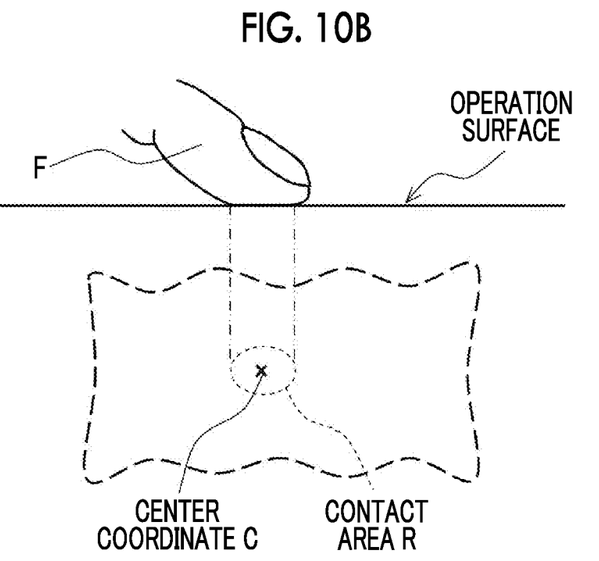

However, in the input device of the related art described above, changing the contact area of the finger of the operator with an operation surface as pressure from the finger applied to the operation surface at the time of a pressing operation increases has not been considered. FIGS. 10A and 10B are schematic views illustrating a relationship between a contact area R of a finger as an operation body F and a center coordinate C, FIG. 10A is a view illustrating a case in which a contact operation is performed with the finger without performing a pressing operation, and FIG. 10B is a view illustrating a case in which the pressing operation is performed with the finger. The contact area R of the finger as the operation body F is relatively small in a state in which the finger is not used to press as illustrated in FIG. 10A, but the contact area R increases due to operation pressure as illustrated in FIG. 10B when the pressing operation is performed with the finger. A position of the center coordinate C of a contact range is shifted due to a change in the contact area R of the operation body F. Further, the positional shift occurring in this way is smaller when the finger is perpendicularly close to the operation surface, and is greater in a state in which the finger lies along the operation surface. Therefore, there is a problem in that the center coordinate C may be changed due to the pressing operation since the contact area R of the finger of the operator is changed at the time of the pressing operation, and the contact area R of the finger is changed greatly and easily in a place away from an end on the side of the input device that the finger approaches.

SUMMARY OF THE INVENTION

The present invention provides an input device which is capable of suppressing an unintended coordinate change due to a change in a contact area of a finger occurring at the time of a pressing operation.

According to an aspect of the present invention, there is provided an input device including: a coordinate input unit including an operation surface on which a pressing operation is capable of being performed and configured to detect contact of an operation body with the operation surface; a pressing detection unit configured to detect that the operation surface is pressed; and a control unit configured to process a detection result of the coordinate input unit and a detection result of the pressing detection unit, in which the control unit obtains a center coordinate of a contact position from the detection result of the coordinate input unit, and the control unit compares the center coordinate before a pressing operation with the center coordinate after a pressing operation when it is determined that there is a pressing operation with respect to the operation surface based on the detection result of the pressing detection unit, and uses the center coordinate before a pressing operation as a center coordinate at the time of the pressing operation when a difference between the compared center coordinates is smaller than a predetermined threshold value.

Thus, the control unit compares the center coordinate before a pressing operation with the center coordinate after a pressing operation when it is determined that there is a pressing operation with respect to the operation surface based on the detection result of the pressing detection unit, and uses the center coordinate before a pressing operation as a center coordinate at the time of the pressing operation when a difference between the compared center coordinates is smaller than a predetermined threshold value. Accordingly, it is possible to provide the input device which is capable of suppressing an unintended coordinate change due to the change in the contact area of the finger occurring at the time of the pressing operation.

Further, in the input device of the present invention, the pressing detection unit may output a detection result depending on pressure when the pressing operation is performed, and the control unit may switch a value of the threshold value based on the detection result of the pressing detection unit.

Thus, since the control unit switches the value of the threshold value based on the detection result of the pressing detection unit, it is possible to set the center coordinate with an appropriate threshold value depending on the pressure when the pressing operation is performed. Further, it is possible to provide the input device which is capable of coping with various input operations since an output signal with respect to the input can be switched depending on operating pressure.

Further, in the input device of the present invention, the control unit may set a reference position in one end part of the operation surface, and set a plurality of threshold values based on a distance from the reference position, and the threshold value may be set to a greater value as the distance from the reference position increases.

Thus, since a greater threshold value is set as the distance from the reference position increases, it is possible to reliably suppress the unintended coordinate change due to a change in a contact area of the finger even when the pressing operation is performed in a position separated from the reference position and a change in the contact area of the finger is large.

Further, in the input device of the present invention, the control unit may set at least two threshold values depending on the center coordinate after a pressing operation approaching or being away from the reference position with respect to a center coordinate before the pressing operation, and the threshold value may be set to a greater value when the center coordinate approaches the reference position.

Thus, it is possible to set an allowable range of shift of an appropriate center coordinate according to a change in the contact area at the time of the pressing operation by setting a greater threshold value on the side close to the reference position with respect to the center coordinate before the contact and setting a smaller threshold value on the side farther away from the reference position.

DESCRIPTION OF THE PREFERRED EMBODIMENTS

First Embodiment

Hereinafter, an input device 100 in a first embodiment will be described.

First, a configuration of the input device 100 in this embodiment will be described using FIGS. 1 to 5A and 5B.

Figure 1:
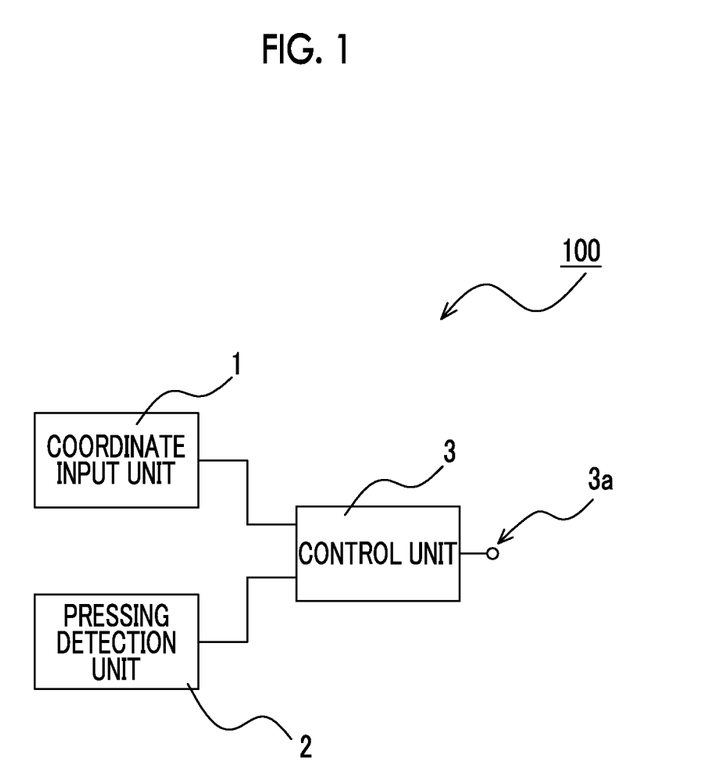
FIG. 1 is a block diagram illustrating an electrical configuration of an input device according to an embodiment of the present invention.
Figure 2:
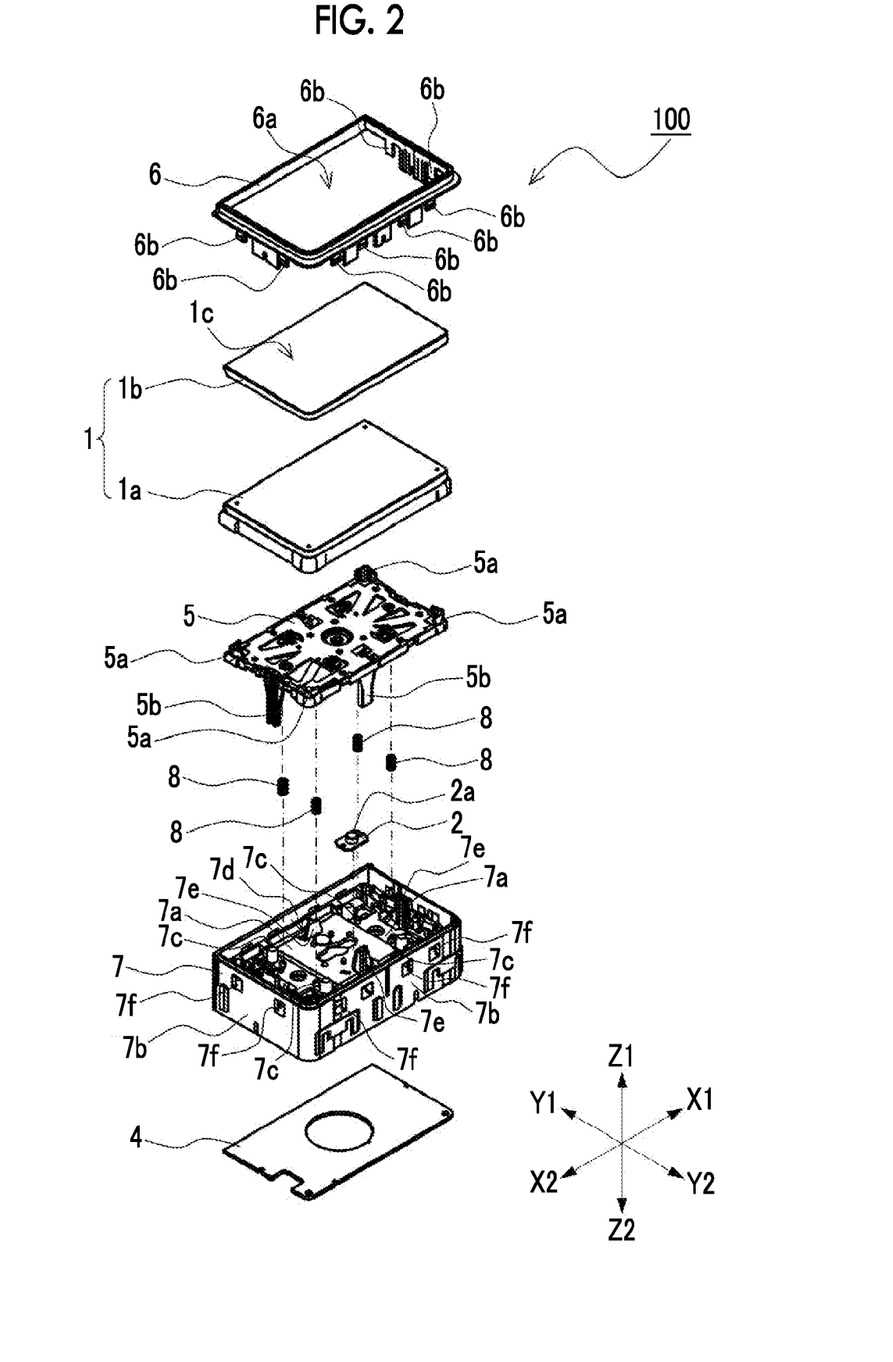
FIG. 2 is an exploded perspective view illustrating components of an input device according to an embodiment of the present invention.
Figure 3:
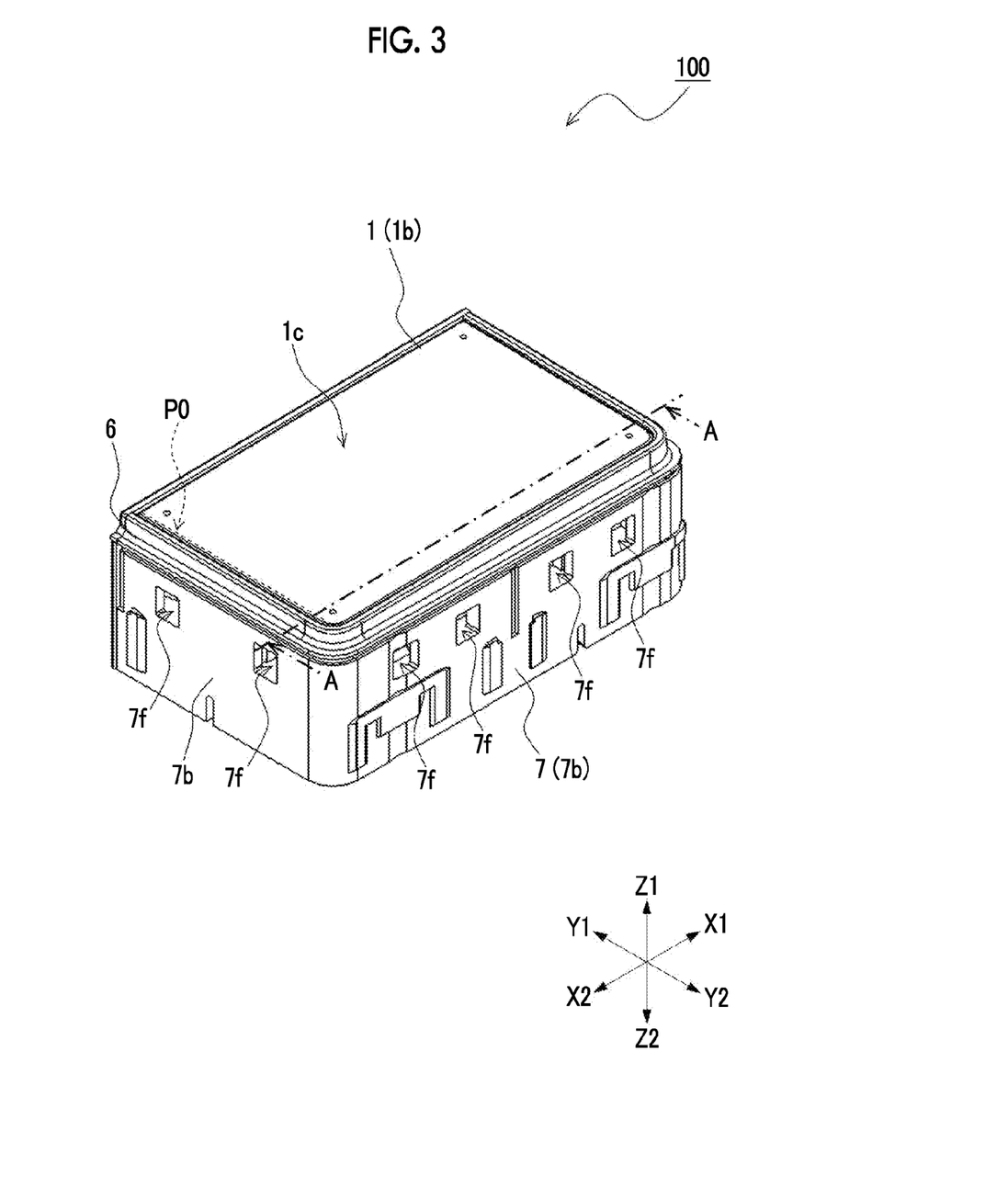
FIG. 3 is a perspective view illustrating an appearance of an input device according to an embodiment of the present invention.
Figure 4A:
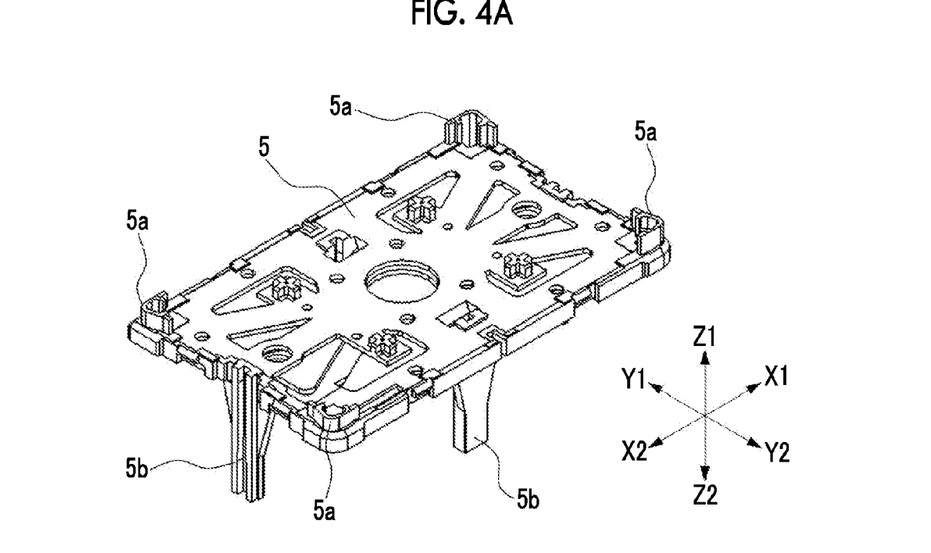
FIGS. 4A and 4B are views illustrating a movable portion.
Figure 4B:
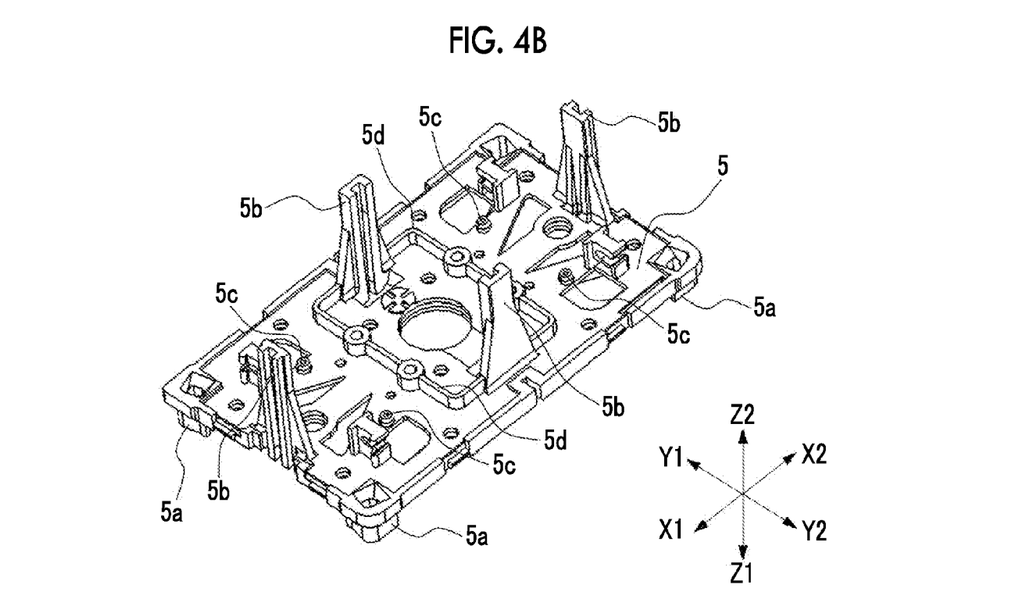
Figure 5A:
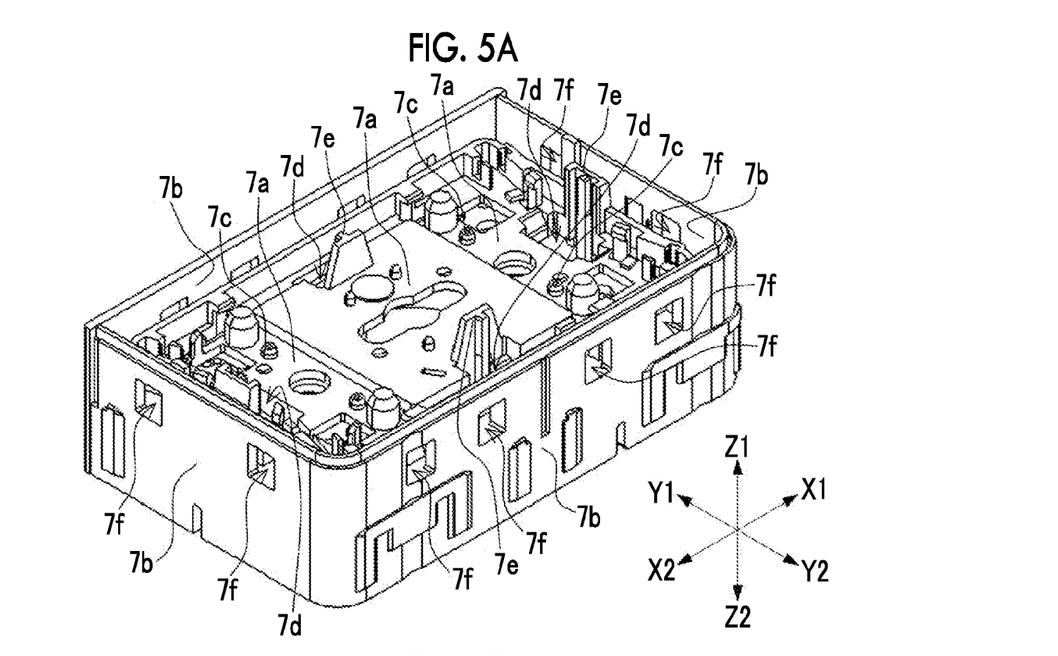
FIGS. 5A and 5B are views illustrating a housing.
Figure 5B:
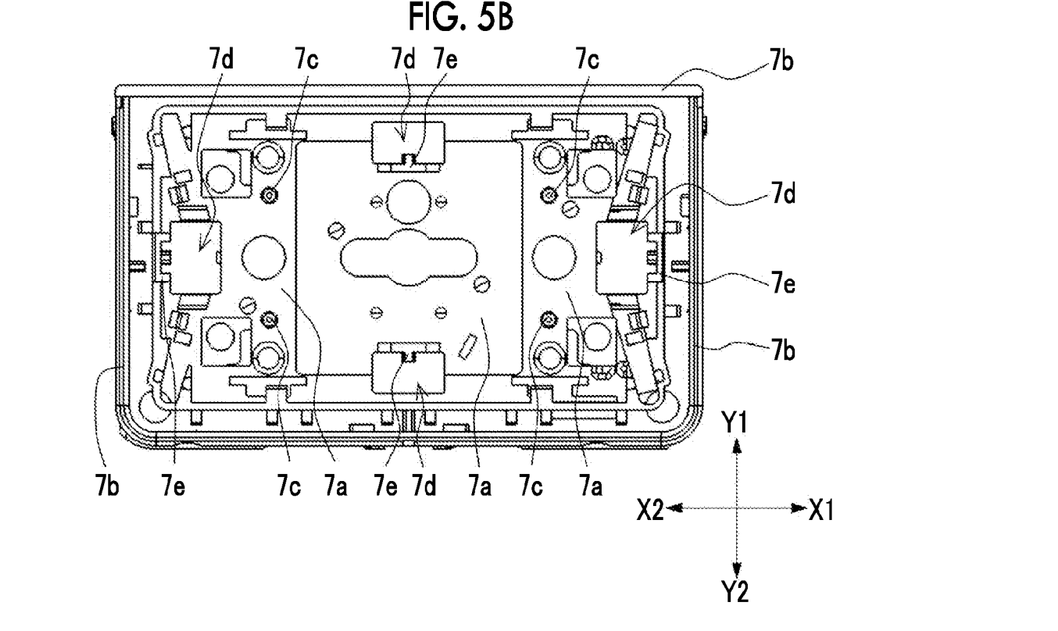

FIG. 1 is a block diagram illustrating an electrical configuration of the input device 100. FIG. 2 is an exploded perspective view illustrating components of the input device 100. FIG. 3 is a perspective view illustrating an appearance of the input device 100. FIGS. 4A and 4B are views illustrating a movable portion 5, FIG. 4A is a perspective view of the movable portion 5 viewed from above (Z1), and FIG. 4B is a perspective view of the movable portion 5 from below (Z2). FIGS. 5A and 5B are views illustrating a housing 7, FIG. 5A is a perspective view of the housing 7, and FIG. 5B is a plan view of the housing 7 viewed from Z1 shown in FIG. 5A.

The input device 100 includes a coordinate input unit 1, a pressing detection unit 2, and a control unit 3, as illustrated in FIG. 1. Further, the input device 100 includes a coordinate input unit 1, a pressing detection unit 2, a substrate 4, a movable portion 5, a holding portion 6, a housing 7, and an elastic member 8, as illustrated in FIG. 2. The input device 100 is formed in a rectangular parallelepiped shape, and an operation surface 1c is provided on an upper surface (a surface in a Z1 direction), and an input operation can be performed by an operation body F such as a finger of an operator coming in contact with or pressing the operation surface 1c, as illustrated in FIG. 3.

The coordinate input unit 1 includes a capacitive touch pad portion 1a and an operation unit 1b, as illustrated in FIG. 2. The operation unit 1b is formed of a synthetic resin material in a rectangular flat substrate shape, an upper surface of the operation unit 1b is formed as a smooth plane, and an operation surface 1c operated by the operation body F is formed. The touch pad portion 1a is formed in a rectangular flat substrate shape with substantially the same size as the operation surface 1c, and is arranged on a lower surface (a surface in a Z2 direction) of the operation surface 1c. The coordinate input unit 1 detects contact of the operation body F with the operation surface 1c by recognizing a change in capacitance occurring in the touch pad portion 1a due to the contact of the operation body F with the operation surface 1c, and outputs a capacitance value that is a detection result to the control unit 3.

The pressing detection unit 2 is a pressure sensor including a pressing operation unit 2a that can be pressed, and the pressing operation unit 2a can be pressed in the Z2 direction. The pressing detection unit 2 detects that a pressing operation is performed since an electrical signal is generated depending on a pressure when the pressing operation unit 2a is pressed and the electrical signal output depending on the pressure increase when the pressure increases due to the pressing operation, and outputs a detection result to the control unit 3. Further, when the pressing operation stops, the electrical signal returns to a state before the operation. Further, in this embodiment, the following description will be given in which, in the pressing detection unit 2, a voltage output depending on the pressure applied to the pressing operation unit 2a is changed, and a detection result is output by a voltage signal of which an output voltage increases when the pressure increases.

The control unit 3 includes an MPU (Micro Processing Unit) and is mounted on a substrate 4. The control unit 3 calculates the capacitance value that is a detection result from the coordinate input unit 1 and a voltage value V that is a detection result from the pressing detection unit 2, and outputs a result of the calculation from an output terminal 3a as a control signal. Further, a timer function or a memory (not illustrated) is included in the control unit 3, such that management of a control interval using the timer function, storage of a value of an operation position signal or a pressing signal, and a calculation result thereof, or the like can be performed.

In the substrate 4, a wiring pattern (not illustrated) is formed of a metal foil made of copper or the like in a base material formed of a resin material such as glass epoxy. The substrate 4 is formed in a rectangular shape, as illustrated in FIG. 2. An MPU or other electronic parts constituting the control unit 3 are mounted on the substrate 4 to constitute a circuit. Further, the coordinate input unit 1 and the pressing detection unit 2 are electrically connected to the substrate 4, and connected to the control unit 3 mounted on the substrate 4 through the wiring pattern provided in the substrate 4.

A movable portion 5 is formed of a synthetic resin material, and has a rectangular shape, as illustrated in FIGS. 2, 4A and 4B. Supporting portions 5a are provided in four corner portions on an upper surface (Z1 direction) side of the movable portion 5, as illustrated in FIG. 4A. Further, on the lower surface (Z2 direction) side of the movable portion 5, guide portions 5b and upper projecting portions 5c are formed to project at four respective places, and a lower end portion 5d is provided to surround the center and the vicinity thereof, as illustrated in FIG. 4B.

The holding portion 6 is formed of a synthetic resin material, and formed in a frame shape having a rectangular opening 6a on an inner side, and a plurality of claw portions 6b are provided along an outer periphery thereof on the lower side (Z2 direction), as illustrated in FIG. 2.

The housing 7 is formed of a synthetic resin material and has a rectangular parallelepiped shape, and a side wall portion 7b is integrally formed so as to surround an inner bottom portion 7a and an outer periphery thereof, as illustrated in FIGS. 2 and 5. Lower projecting portions 7c are provided at four places in the inner bottom portion 7a, and through holes 7d into which the guide portion 5b provided in the movable portion 5 can be inserted are provided at four places, as illustrated in FIG. 5B. Further, a regulation portion 7e is arranged in a position corresponding to the guide portion 5b in one side of each through hole 7d. In the side wall portion 7b, a fitting hole 7f is provided in a position corresponding to a claw portion 6b of the holding portion 6.

The elastic member 8 is formed of a metal wire material and is formed in a coil spring shape, as illustrated in FIG. 2. Further, in this embodiment, four elastic members 8 are used.

Figure 6A:
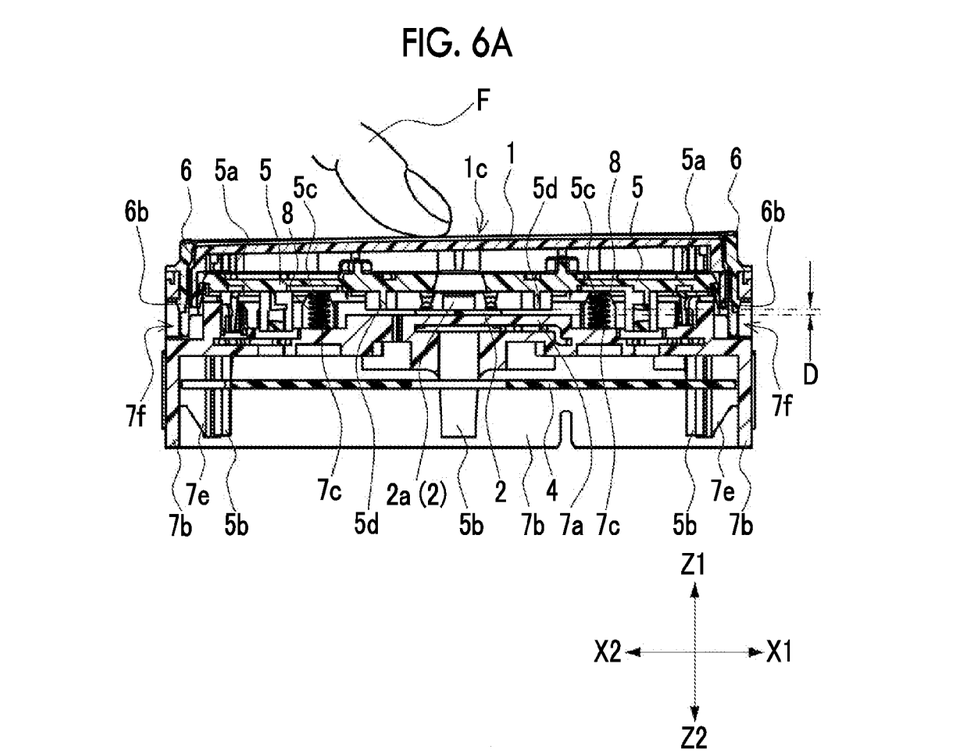
FIGS. 6A and 6B are schematic cross-sectional views illustrating a structure of an input device according to an embodiment of the present invention.
Figure 6B:
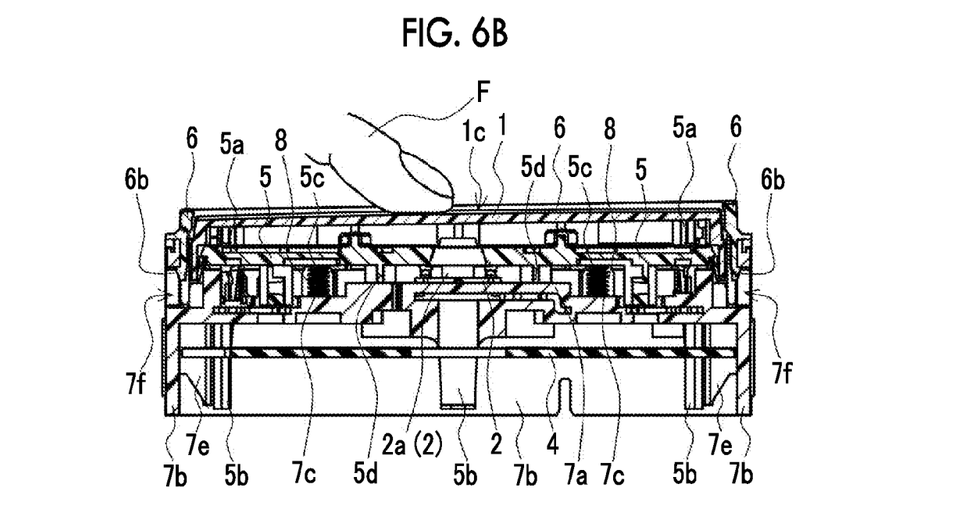

Next, the structure of the input device 100 according to this embodiment will be described using FIGS. 2, 6A and 6B. FIGS. 6A and 6B are schematic cross-sectional views illustrating the structure of the input device 100 according to this embodiment and are views illustrating an A-A section illustrated in FIG. 3, FIG. 6A is a view illustrating a state before the operation body F performs a pressing operation, and FIG. 6B is a view illustrating a state when the operation body F performs the pressing operation.

The substrate 4 is received on the lower side of the inner bottom portion 7a on the inner side of the side wall portion 7b of the housing 7, as illustrated in FIG. 6A.

The pressing detection unit 2 is arranged on a surface on the upper side (Z1 direction) of the inner bottom portion 7a of the housing 7, and a lower surface of the movable portion 5 is arranged so as to come in contact with the upper surface of the pressing operation unit 2a provided in the pressing detection unit 2. In this case, the guide portion 5b provided in the movable portion 5 is inserted into the through hole 7d provided in the housing 7, and arranged along a regulation portion 7e. Therefore, the movable portion 5 is guided to be movable in a direction (Z-axis direction) going straight to the inner bottom portion 7a without being moved or inclined in a surface direction (X-Y direction illustrated in FIG. 2) along the inner bottom portion 7a of the housing 7.

The elastic member 8 is interposed between the housing 7 and the movable portion 5 to bias the movable portion 5 upward against the housing 7 in a state in which a lower side (the Z2 side) of the elastic member 8 is positioned by a lower projecting portion 7c provided in the inner bottom portion 7a of the housing 7 and an upper side (the Z1 side) thereof is positioned by an upper projecting portion 5c provided on a lower surface side of the movable portion 5, as illustrated in FIGS. 6A and 6B. In this state, spacing is formed by a distance D between the lower end portion 5d provided on the lower surface (Z2 direction) side of the movable portion 5 and the upper surface of the inner bottom portion 7a of the housing 7 facing the lower end portion 5d, as illustrated in FIG. 6B.

The coordinate input unit 1 is fixed in a state in which the coordinate input unit 1 is supported by a supporting portion 5a provided on an upper surface of the movable portion 5, as illustrated in FIGS. 6A and 6B. Since the coordinate input unit 1 and the movable portion 5 are supported so that an upper surface side of the inner bottom portion 7a of the housing 7 can be moved in a vertical direction (Z1-Z2) between the housing 7 and the holding portion 6 by the claw portion 6b of the holding portion 6 being fitted to the fitting hole 7f provided in the housing 7. When the claw portion 6b is fitted into the fitting hole 7f in this way, the operation surface 1c of the coordinate input unit 1 is exposed to the opening 6a provided in the holding portion 6 in a state in which the operation surface 1c can be operated, resulting in the input device 100 illustrated in FIG. 3.

The operation surface 1c of the coordinate input unit 1 is exposed to the opening 6a of the holding portion 6. Accordingly, when the operation body F such as a finger comes in contact with the operation surface 1c, the control unit 3 can calculate a detection result of the coordinate input unit 1 to determine a coordinate at which the operation is performed and to perform coordinate input. Further, as illustrated in FIG. 6B, when the operation body F presses the operation surface 1c, pressing force is applied to the movable portion 5 to which the coordinate input unit 1 is fixed, the elastic member 8 is compressed by this force, and accordingly, the movable portion 5 and the coordinate input unit 1 are moved to the lower side (Z2 direction). The movable portion 5 can move to a position in which the lower end portion 5d provided on the lower surface (Z2 direction) side and the upper surface of the inner bottom portion 7a of the housing 7 facing the lower end portion 5d come in contact with each other.

Since the movable portion 5 moves to the lower side in this way, the lower surface of the movable portion 5 presses the pressing operation unit 2a provided in the pressing detection unit 2 against the lower side (Z2 illustrated in FIGS. 6A and 6B). Since the detection result is output as the voltage value V from the pressing detection unit 2 depending on the pressure applied to the pressing operation unit 2a, the control unit 3 can calculate the detection result, determine that the pressing operation has been performed, and perform the pressing input. When the pressure is not applied to stop the pressing operation, the elastic member 8 is extended, the movable portion 5 and the coordinate input unit 1 return to original positions, and pressure is not applied to the pressing operation unit 2a. Accordingly, the detection result of the pressing detection unit 2 can also return to a state before the pressing operation.

Figure 7A:
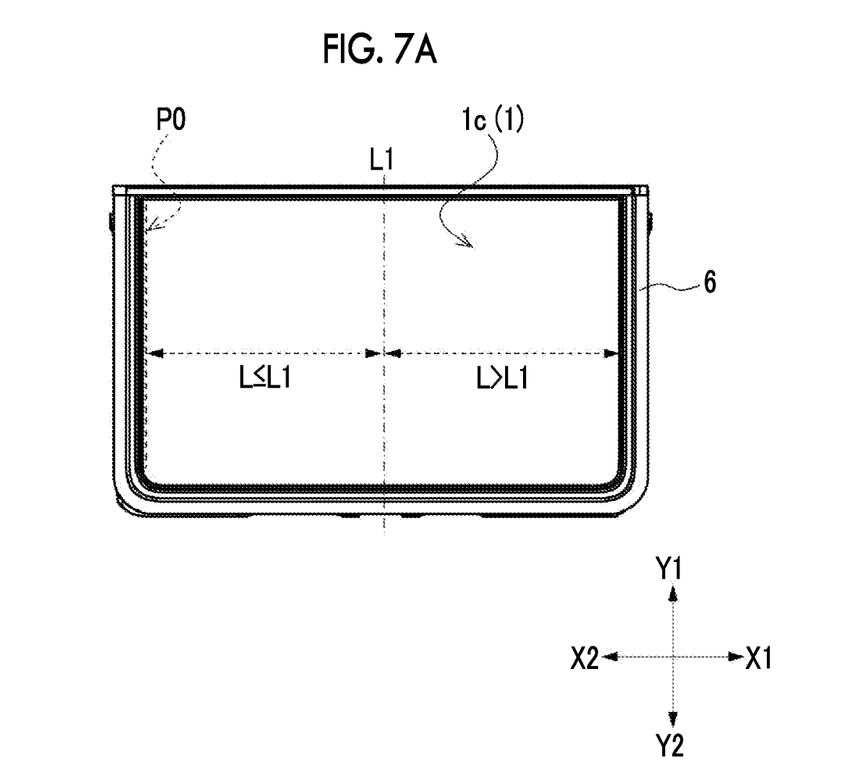
FIGS. 7A and 7B are plan views illustrating a relationship between a reference position and a distance determination threshold value.
Figure 7B:
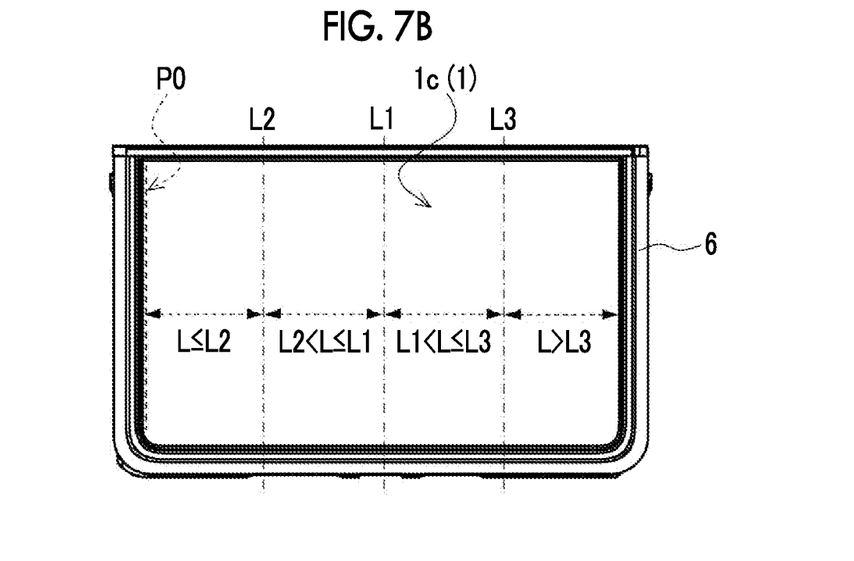
Figure 8:
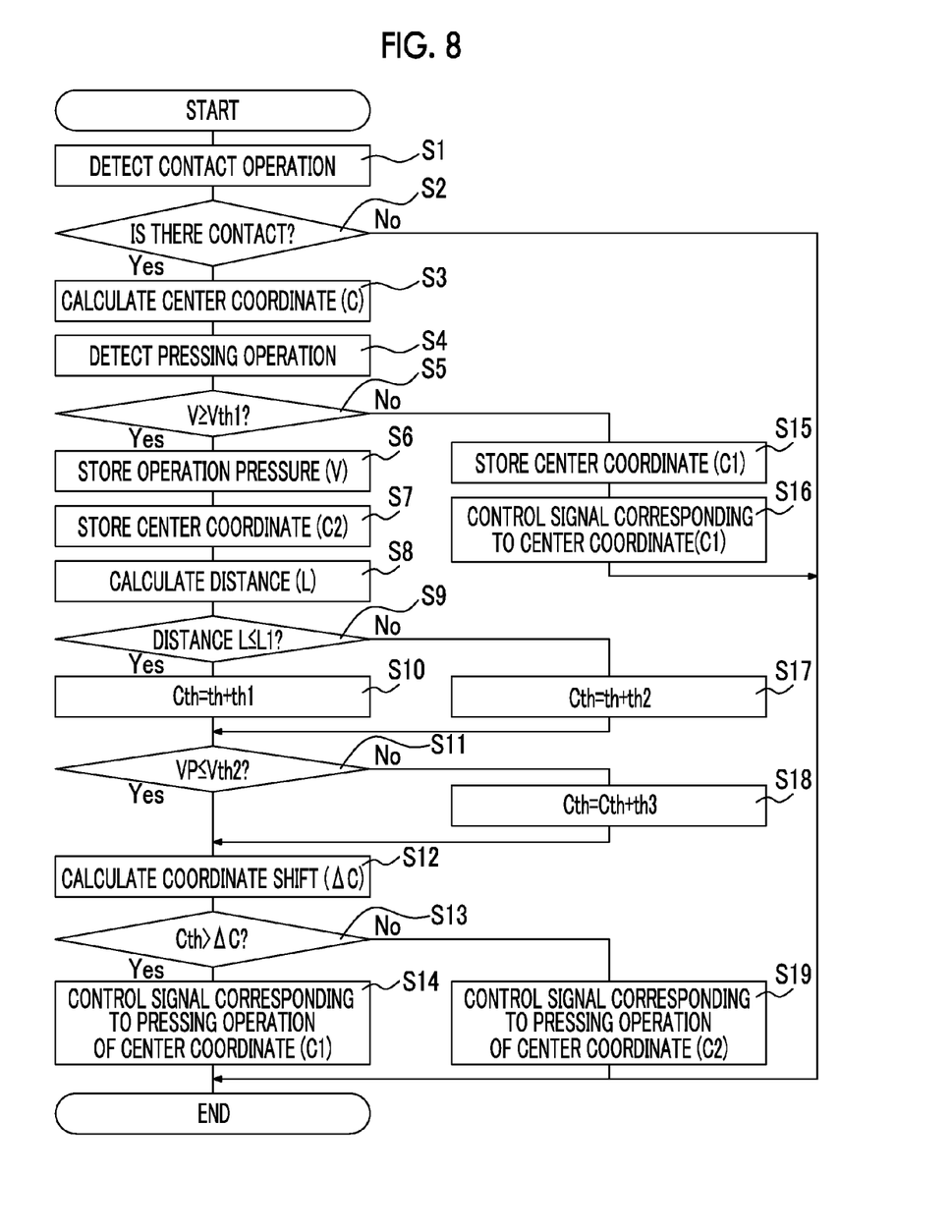
FIG. 8 is a flowchart illustrating an operation of the input device according to an embodiment of the present invention.

Next, an operation of the input device 100 according to this embodiment will be described using FIGS. 3, 7A, 7B, and 8. FIGS. 7A and 7B are plan views illustrating a relationship between a reference position P0 and a distance determination threshold value Ln (n is a natural number). FIG. 7A is a view illustrating a relationship between the reference position P0 and the distance determination threshold value L1 in this embodiment, and FIG. 7B is a view illustrating a relationship between the reference position P0 and three distance determination threshold values L1, L2 and L3 according to a modification example of this embodiment. FIG. 8 is a flowchart illustrating an operation of the input device 100. Processing steps shown in the flowchart of FIG. 8 are repeatedly and regularly performed by a timer function or the like of the control unit 3.

In the control unit 3, the reference position P0 is set in one end portion (on the X2 side illustrated in FIGS. 3, 7A and 7B) in which the finger approaches the operation surface 1c, as illustrated in FIGS. 3, 7A and 7B in advance. Further, a first pressing threshold value Vth1, a second pressing threshold value Vth2, a distance determination threshold value L1, an initial value th of the coordinate shift determination threshold value Cth, a first correction value th1, a second correction value th2, and a third correction value th3 are stored in the memory included in the control unit 3.

The first pressing threshold value Vth1 is a threshold value for determining the presence or absence of a pressing operation with respect to the pressing detection unit 2, and the second pressing threshold value Vth2 is a threshold value for determining the magnitude of a pressing force. The distance determination threshold value L1 is a threshold value for determining the distance between the center coordinate C2(x, y) of the pressing operation position and the reference position P0, and a value corresponding to a distance from the reference position P0 to L1 illustrated in FIG. 7A is set. The initial value th of the coordinate shift determination threshold value Cth is a reference value of a threshold value for determining whether coordinate shift is a position shift due to the pressing operation. Further, the first correction value th1 and the second correction value th2 are values for correcting the coordinate shift determination threshold value Cth depending on the operation position, and the second correction value th2 is set to a greater value than the first correction value th1. Further, the third correction value th3 is a value for correcting the coordinate shift determination threshold value Cth depending on pressing operation pressure. The threshold values and the correction values are obtained by experiments in advance.

An operation when the operation body F does not come in contact with the operation surface 1c in an initial state will be first described.

The control unit 3 acquires a capacitance value that is a detection result of the coordinate input unit 1 in step S1 shown in the flowchart of FIG. 8.

In step S2, the control unit 3 determines the presence or absence of the contact based on the presence or absence of the change in the acquired capacitance value, proceeds to step S3 when the presence of the contact is determined, and ends the operation when the absence of the contact is determined. Therefore, when the input operation is not performed, the control unit 3 enters a standby state and does not perform an operation.

Next, an operation when the operation body F comes in contact with the operation surface 1c and does not press the operation surface 1c so as to perform an operation will be described. Further, description of steps S1 and S2 that have been already described will be omitted to simplify the description.

When the operation body F comes in contact with the operation surface 1c so as to perform an operation, the presence of the contact is determined in step S2 and the process proceeds to step S3.

In step S3, the control unit 3 obtains a center coordinate C(x, y) (indicated by C in FIG. 8) of the contact position using the capacitance value acquired in step S1, and proceeds to step S4. Further, a method of obtaining the center coordinate C(x, y) of the operation position in the coordinate input device includes some methods, such as weighted averaging of an amount of a change in a capacitance value, but a specific method will be omitted herein. Further, it is assumed that x of the center coordinate C(x, y) is a value indicating a position along the X axis on the operation surface 1c of the coordinate input unit 1 illustrated in FIGS. 3, 7A and 7B, and y indicates a value indicating a position along the Y axis. Therefore, when a specific value is determined for x and y through calculation of the control unit 3, the center coordinate C(x, y) is determined.

In step S4, the control unit 3 acquires the voltage value V of the output voltage that is the detection result of the pressing detection unit 2 and proceeds to step S5.

In step S5, the control unit 3 compares the first pressing threshold value Vth1 with the acquired voltage value V to determine the presence of the pressing operation with respect to the operation surface 1c of the coordinate input unit 1, determines the presence of the pressing operation when the acquired voltage value V is equal to or greater than the first pressing threshold value Vth1, and proceeds to step S6. Further, when the voltage value V is lower than the first pressing threshold value Vth1, the absence of the pressing operation is determined and the process proceeds to step S15.

Here, a case in which the process proceeds to step S15 which is an operation when the operation body F comes in contact with the operation surface 1c and does not press against the operation surface 1c so as to perform an operation will be described. In step S15, the control unit 3 stores the value of the center coordinate C(x, y) obtained in step S3 as a center coordinate C1(x, y) (indicated by C1 in FIG. 8) at the time of the contact operation in the memory of the control unit 3, and proceeds to step S16.

In step S16, the control unit 3 outputs a control signal corresponding to the center coordinate C1(x, y) at the time of the contact operation, and ends the operation. As described above, it is possible to perform the input operation by performing a contact operation using the operation surface 1c of the coordinate input unit 1, and to function as the coordinate input device.

Next, an operation when the operation body F presses against the operation surface 1c so as to perform an operation will be described. When a pressing operation is performed, contact with the operation surface 1c is necessarily performed before the pressing operation is performed, and thus, the center coordinate C1(x, y) at the time of the contact operation stored in step S15 is assumed to have been stored. Further, description of steps S1 to S5 and steps S15 and S16 that have been already described will be omitted.

When the operation body F performs the pressing operation and it is determined that the pressing operation occurs in step S5, the process proceeds to step S6.

In step S6, the control unit 3 stores the voltage value V of the output voltage of the pressing detection unit 2 acquired in step S4 in the memory of the control unit 3 as operation pressure VP, and the process proceeds to step S7.

In step S7, the control unit 3 stores the value of the center coordinate C(x, y) obtained in step S3 in the memory of the control unit 3 as the center coordinate C2(x, y) (C2 indicated in FIG. 8) at the time of the pressing operation, and proceeds to step S8.

In step S8, the control unit 3 calculates a distance L from the reference position P0 to the center coordinate C2(x, y) at the time of the pressing operation, and proceeds to step S9. The value of the distance L from the reference position P0 to the center coordinate C2(x, y) at the time of the pressing operation is expressed by a value of "x" of C2(x, y) when the x coordinate of the reference position P0 illustrated in FIGS. 3, 7A and 7B is "0" (zero).

In step S9, the control unit 3 compares the value of the distance L obtained in step S8 with the distance determination threshold value L1 set in advance. When the center coordinate C2(x, y) at the time of the pressing operation is between the reference position P0 and L1 illustrated in FIG. 7A (L≤L1), the process proceeds to step S10 so as to cause the value of the distance L to be equal to or smaller than the distance determination threshold value L1. When the center coordinate C2(x, y) at the time of the pressing operation is in a position L separated from the reference position P0 relative to L1 illustrated in FIG. 7A (L>L1), the process proceeds to step S17 so as to cause the value of the distance L to be greater than the distance determination threshold value L1.

In step S10, since the distance L is determined to be equal to or smaller than the distance determination threshold value L1, the control unit 3 calculates the coordinate shift determination threshold value Cth by adding the initial value th of the coordinate shift determination threshold value Cth to the first correction value th1, stores the coordinate shift determination threshold value Cth in the memory included in the control unit 3, and proceeds to step S11.

In step S17, since the distance L is determined to be greater than the distance determination threshold value L1, the control unit 3 calculates the coordinate shift determination threshold value Cth by adding the initial value th of the coordinate shift determination threshold value Cth to the second correction value th2, stores the coordinate shift determination threshold value Cth in the memory included in the control unit 3, and proceeds to step S11.

As described above, the control unit 3 sets a plurality of coordinate shift determination threshold values Cth based on the distance L from the reference position P0, and performs control so that the coordinate shift determination threshold value Cth is set to a greater value as the distance from the reference position P0 increases. Therefore, a pressing position is a position separated from the reference position P0, and the finger which is the operation body F lies along the operation surface 1c. Accordingly, it is possible to reliably suppress an unintended coordinate change due to a change in the contact area R of the finger even when the contact area R of the finger is changed greatly and easily.

In step S11, the control unit 3 compares the operation pressure VP stored in step S6 with the second pressing threshold value Vth2 set in advance, proceeds to step S12 when the value of the operation pressure VP is equal to or smaller than the second pressing threshold value Vth2, and proceeds to step S18 when the value of the operation pressure VP is greater than the second pressing threshold value Vth2.

In step S18, since it is determined that the operation pressure VP is greater than the second pressing threshold value Vth2, the control unit 3 calculates a new coordinate shift determination threshold value Cth by adding the third correction value th3 to the coordinate shift determination threshold value Cth obtained in step S10 or S17. Further, the control unit 3 stores the calculated new coordinate shift determination threshold value Cth in the memory included in the control unit 3, and proceeds to step S12.

As described above, the control unit 3 performs control to switch the value of the threshold value based on the detection result of the pressing detection unit 2.

In step S12, the control unit 3 calculates a difference ΔC between the center coordinate C1(x, y) at the time of a contact operation before the pressing operation stored in the memory and the center coordinate C2(x, y) after the pressing operation, and proceeds to step S13. The calculated ΔC indicates shift of the center coordinate due to the pressing operation.

In step S13, the control unit 3 compares the difference ΔC between the center coordinates obtained in step S12 with the coordinate shift determination threshold value Cth stored in the memory, and proceeds to step S14 when the difference ΔC between the center coordinates is smaller than the coordinate shift determination threshold value Cth. Further, the control unit 3 proceeds to step S19 when the difference ΔC between the center coordinates is equal to or greater than the coordinate shift determination threshold value Cth.

In step S14, the difference ΔC between the center coordinate C1(x, y) before the pressing operation and the center coordinate C2(x, y) after the pressing operation is determined to be smaller than the predetermined coordinate shift determination threshold value Cth. In this case, the difference ΔC between the center coordinates is determined to be the shift of the center coordinate due to the pressing operation. Therefore, the control unit 3 outputs a control signal corresponding to the pressing operation C1(x, y) using the center coordinate C1(x, y) before the pressing operation as a center coordinate at the time of the pressing operation, and ends the operation.

In step S19, the difference ΔC between the center coordinate C1(x, y) before the pressing operation and the center coordinate C2(x, y) after the pressing operation is determined to be equal to or greater than the predetermined coordinate shift determination threshold value Cth. In this case, it is determined that the operator intends to move the operation body F (finger), rather than shift the center coordinate due to the pressing operation. Therefore, the control unit 3 outputs a control signal corresponding to the pressing operation C2(x, y) using the center coordinate C2(x, y) after the pressing operation as the center coordinate at the time of the pressing operation, and ends the operation.

Hereinafter, effects of this embodiment will be described.

The input device 100 of this embodiment includes the coordinate input unit 1 including the operation surface 1c on which a pressing operation can be performed and detecting the contact of the operation body F with the operation surface 1c, the pressing detection unit 2 that detects that the operation surface 1c is pressed, and the control unit 3 that processes the detection result of the coordinate input unit 1 and the detection result of the pressing detection unit 2, in which the control unit 3 obtains center coordinates (C1, C2) of the contact position from the detection result of the coordinate input unit 1. When it is determined that there is a pressing operation with respect to the operation surface 1c based on the detection result of the pressing detection unit 2, the control unit 3 compares the center coordinates (C1, C2) before the pressing operation and after the pressing operation, and uses the center coordinate C1(x,y) before the pressing operation as a center coordinate at the time of the pressing operation when the difference ΔC between the compared center coordinates is smaller than the predetermined threshold value Cth.

Accordingly, it is possible to provide the input device which is capable of suppressing an unintended coordinate change due to a change in a contact area R of the finger occurring at the time of the pressing operation.

Further, in the input device 100 of this embodiment, the pressing detection unit 2 outputs the detection result depending on the pressure when the pressing operation is performed, and the control unit 3 switches a value of the coordinate shift determination threshold value Cth based on the detection result of the pressing detection unit 2.

Accordingly, it is possible to set the center coordinate with an appropriate threshold value depending on the pressure when the pressing operation is performed. Further, it is possible to provide the input device which is capable of coping with various input operations since an output signal with respect to the input can be switched depending on operating pressure.

Further, in the input device 100 of this embodiment, the control unit 3 sets the reference position P0 in one end portion of the operation surface 1c, and sets a plurality of the coordinate shift determination threshold values Cth based on the distance L from the reference position P0, and the coordinate shift determination threshold value Cth is set to a greater value as the distance from the reference position P0 increases.

Accordingly, even when the pressing operation is performed in a position separated from the reference position P0, the finger which is the operation body F lies along the operation surface 1c, and the contact area R of the finger is changed greatly and easily, it is possible to reliably suppress an unintended coordinate change due to a change in the contact area R of the finger.

As described above, according to the input device 100 of this embodiment, it is possible to provide the input device which is capable of suppressing an unintended coordinate change due to the change in the contact area of the finger occurring at the time of a pressing operation.

While the input device 100 according to the embodiment of the present invention has been described above in detail, the present invention is not limited to the above-described embodiment and may be changed and implemented in various ways without departing from the gist thereof. For example, the present invention can be changed and implemented as follows and such embodiments belong to the technical scope of the present invention.

(1) In this embodiment, the example in which the value of the coordinate shift determination threshold value Cth is switched by adding the first correction value th1 or the second correction value th2 to the initial value th of the coordinate shift determination threshold value Cth depending on the distance L from the reference position P0 to the center coordinate C2(x, y) at the time of the pressing operation has been described. On the other hand, the control unit 3 may set at least two threshold values depending on the center coordinate C2(x, y) after the pressing operation approaching or being away from the reference position P0 with respect to the center coordinate C1(x, y) before the pressing operation, and the two threshold values may be set to a greater value when the center coordinate C2(x, y) approaches the reference position in a modification example. In the case of this modification example, it is possible to set the allowable range of the shift of the appropriate center coordinate according to the change in the contact area R at the time of the pressing operation by setting a greater threshold value on the side close to the reference position P0 with respect to the center coordinate C1 before the contact, and setting a small threshold value on the side away from the center coordinate C1 before the contact.

(2) While the example in which the value of the coordinate shift determination threshold value Cth is switched depending on the pressure when the pressing operation is performed has been illustrated and described in this embodiment, the control signal output by the control unit 3 may also be changed depending on the pressure in a modification example.

(3) While the example in which the distance determination threshold value Ln is set to L1 and the value of the coordinate shift determination threshold value Cth is switched when the value is close to the distance determination threshold value L1 and when the value is far from the distance determination threshold value L1 has been illustrated and described in this embodiment, a plurality of distance determination threshold values Ln may be set, as illustrated in FIG. 7B. In this case, a correction value is set in fine steps according to a plurality of distance setting threshold values L1, L2, and L3. Accordingly, even when the pressing operation is performed in a position separated from the reference position P0 and the contact area of the finger is changed greatly and easily, it is possible to further reliably suppress an unintended coordinate change due to the pressing operation. Further, the coordinate shift determination threshold value Cth may be set linearly depending on the distance L instead of gradual switching of the coordinate shift determination threshold value Cth based on the distance determination threshold value Ln in a modification example.

(4) While the example in which the reference position P0 is set in a linear shape in one end portion in which the finger approaches the operation surface 1c has been illustrated and described in this embodiment, the reference position may be set as a point and the coordinate shift determination threshold value Cth may be set depending on the distance L from this point in a modification example.

(5) While the example in which the pressing detection unit 2 is a pressure sensor has been illustrated and described in this embodiment, a push switch in which switching output in a plurality of steps is obtained by pressure due to the pressing operation may be used in a modification example.

It should be understood by those skilled in the art that various modifications, combinations, sub-combinations and alterations may occur depending on design requirements and other factors insofar as they are within the scope of the appended claims of the equivalents thereof.

What is claimed is:

1. An input device comprising:
   a coordinate input unit having an operation surface on which a pressing operation is performed by an operation body, the coordinate input unit being configured to detect contact of the operation body with the operation surface;
   a pressing detection unit configured to detect that the operation surface is pressed; and
   a control unit configured to process a contact detection result of the coordinate input unit and a pressing detection result of the pressing detection unit, wherein the control unit obtains a first center coordinate of a contact position based on the contact detection result and, if a pressing operation is detected by the pressing detection unit, obtains a second center coordinate of the contact position after the pressing operation, and compares the first center coordinate with the second center coordinate and sets the first center coordinate as a center coordinate for the pressing operation if a difference between the first and second center coordinates is smaller than a predetermined threshold value, wherein the control unit sets a reference position at an end portion of the operation surface, and provides a plurality of threshold values based on a distance of the contact position from the reference position, such that the greater the distance, the greater the threshold value is, the plurality of threshold values including:
- a first threshold value for the second center coordinate which is closer to the reference position than the first center coordinate; and
- a second threshold value for the second center coordinate which is farther away from the reference position than first center coordinate the first threshold value being greater than the second threshold value.

2. The input device according to claim 1,
wherein the pressing detection unit outputs the pressing detection result according to a pressure of the pressing operation, and
wherein the control unit changes the predetermined threshold value based on the pressing detection result.

3. A input device comprising:
- a coordinate input unit having an operation surface on which a pressing operation is performed by an operation body, the coordinate input unit being configured to detect contact of the operation body with the operation surface;
- a pressing detection unit configured to detect that the operation surface is pressed; and
- a control unit configured to process a contact detection result of the coordinate input unit and a pressing detection result of the pressing detection unit, wherein the control unit obtains a first center coordinate of a contact position based on the contact detection result and, if a pressing operation is detected by the pressing detection unit, obtains a second center coordinate of the contact position after the pressing operation, and compares the first center coordinate with the second center coordinate and sets the first center coordinate as a center coordinate for the pressing operation if a difference between the first and second center coordinates is smaller than a predetermined threshold value, wherein the control unit provides at least two threshold values including a first threshold value for the second center coordinate which is closer to a reference position than the first center coordinate, and a second threshold value for the second center coordinate which is farther away from the reference position than first center coordinate, the first threshold value being greater than the second threshold value.

4. The input device according to claim 3, wherein the control unit sets the reference position at an end portion of the operation surface.

* * * * *